United States Patent [19]
Van Bezeij

[11] Patent Number: 6,070,562
[45] Date of Patent: Jun. 6, 2000

[54] ENGINE BLOCK FOR A MULTI-CYLINDER INTERNAL COMBUSTION ENGINE

[75] Inventor: Nico Johan Van Bezeij, Stiphout/Helmind, Netherlands

[73] Assignee: Eisenwerk Bruehl GmbH, Bruehl, Germany

[21] Appl. No.: 09/011,485

[22] PCT Filed: May 7, 1997

[86] PCT No.: PCT/EP97/02316

§ 371 Date: Feb. 4, 1998

§ 102(e) Date: Feb. 4, 1998

[87] PCT Pub. No.: WO97/46799

PCT Pub. Date: Dec. 11, 1997

[30] Foreign Application Priority Data

Jun. 5, 1996 [DE] Germany ............................ 296 09 950

[51] Int. Cl.[7] ........................................................ F02F 7/00
[52] U.S. Cl. ................................... 123/195 R; 123/41.67; 123/195 H; 384/429
[58] Field of Search ........................... 123/195 R, 195 H, 123/196 R, 193.1, 41.67; 384/429

[56] References Cited

U.S. PATENT DOCUMENTS

| | | | |
|---|---|---|---|
| 4,446,827 | 5/1984 | Kubozuka | 123/195 R |
| 4,520,770 | 6/1985 | Ogawa | 123/195 H |
| 4,651,691 | 3/1987 | Ogawa | 123/195 H |
| 4,922,870 | 5/1990 | Pietsc et al. | 123/195 R |
| 5,860,404 | 1/1999 | Tanaka | 123/196 R |

FOREIGN PATENT DOCUMENTS

2 150 635   7/1985   United Kingdom ............... 123/195 H

*Primary Examiner*—Willis R. Wolfe
*Assistant Examiner*—Brian Hairston
*Attorney, Agent, or Firm*—Venable; George H. Spencer; Catherine M. Voorhees

[57] ABSTRACT

A cylinder block for a multi-cylinder internal combustion engine with a multi-bearing crankshaft and a water jacket surrounding the cylinders. The outer wall of the water jacket extends downwards approximately into a parting plane of the crankshaft bearings. A base frame rests against and is connected to a contact surface formed by a circumferential free edge of the water jacket outer wall. The crankshaft bearings are arranged on the base frame and detachable bearing caps are arranged and fastened by screws on the side of the base frame facing the cylinders.

7 Claims, 6 Drawing Sheets

ENGINE BLOCK FOR A MULTI-CYLINDER INTERNAL COMBUSTION ENGINE

BACKGROUND OF THE INVENTION

Efforts have been made to reduce the weight of multiple cylinder internal combustion engines, particularly in passenger vehicles. Therefore, one preceeded to make the cylinder blocks from light metal; but, as a result, two different materials had to be used, namely light metal for the cylinder block and appropriate grey cast iron grades for the liners forming the cylinders. For this reason, attempts were made by means of structural measures to design a cylinder block which could also be made from grey cast iron while having a suitably high fatigue strength. A cylinder block of this type is described in WO 94/07017. When suitable grey cast iron grades are used, for example, compact graphite cast iron, it is possible to also produce a thin-walled cylinder block. A defined, straight-line force flow between a cylinder head and crankshaft bearing results from the arrangement of U-shaped reinforcing ribs on the outside of the water jacket in the region of the parting plane between respectively two adjoining cylinders and from an in-line association of the cylinder head screws with respect to the fastening screws of the bearing cap of the crankshaft bearing, which cap is attached from below. This allows a stability calculation with sufficient precision so that, in the dimensioning of the remaining, largely planar elements of the cylinder block which serve as a jacket, the wall thickness must practically be considered only with a view to a flawless casting ability. The previously known cylinder block, however, is designed such that the parts of the bearing shells forming the bearing duct are respectively cast integral in the parting plane between two cylinders via corresponding webs.

SUMMARY OF THE INVENTION

It is now the object of the invention to create a cylinder block that allows for still further weight reduction.

The invention accomplishes this object by a cylinder block for a multiple-cylinder internal combustion engine having a multiply seated crankshaft and having a water jacket surrounding the cylinders, with the outer wall of the water jacket being extended downward extending approximately into the parting plane of the crankshaft bearings and the circumferential free edge of the water jacket forming a contact face, and having a base frame which rests against this contact face and is connected with the same, on which base frame the crankshaft bearings are arranged whose detachable bearing caps are arranged on the side of the base frame facing the cylinders. This design offers the advantage that the forces that need to be absorbed between the cylinder head closing off the engine block towards the top and the crankshaft bearings are absorbed directly via the parts of the crankshaft bearings associated with the base frame, so that the associated bearing caps and their fastening screws must absorb correspondingly smaller forces and can therefore be dimensioned with correspondingly thinner walls. At the same time, the base frame offers a considerable stiffening of the free edge of the outer wall of the water jacket, which outer wall is extended downward; this results in a high fatigue strength of the block as a whole in spite of the small wall thickness. It is particularly advantageous if at least the cylinder block is made from vermicular cast iron (compacted graphite iron, advantageously compacted graphite iron 40) which, compared to other cast iron grades, has a higher loading capacity through tensile forces and a high internal damping for stresses due to vibrations, so that a "drumming" is eliminated in spite of the relatively thin walls. A further advantage of the design according to the invention is that the crankshaft bearings are completely mounted on the base frame and that the connection with the cylinder block is made only then.

An advantageous feature of the invention provides that the base frame is connected to the free edge of the outer wall of the water jacket by means of screws, with respectively two screws extending in the center plane of a crankshaft bearing. This ensures that the force flow between the fastening screws of the cylinder head and the fastening screws of the base frame is disposed in one plane. This furthermore results in the fact that, respectively for one cylinder, for four fastening screws of the cylinder head correspondingly four fastening screws are provided for the base frame.

A particularly advantageous feature of the invention provides in this context that the screws arranged in the center plane of the crankshaft bearing for the fastening of the base frame are approximately aligned with the screws for the fastening of the cylinder head. Because of the improvement of the fatigue strength of the cylinder block, which is accomplished through the arrangement of the base frame, it suffices if, in this region, the fastening screws for the base frame are disposed as closely as possible to the crankshaft bearing. A precise alignment, as is still provided in the previously known cylinder block, is not necessary for the design according to the invention.

Another advantageous feature of the invention provides that, in addition to the screws arranged in the center plane of the crankshaft bearings, the base frame is connected with the edge of the outer wall of the water jacket via respectively two further screws, respectively arranged in a parallel plane extending through the cylinder axis. This also makes it possible to provide the outer wall of the water jacket in its lower region with a wave structure, seen in the horizontal section, which leads to an increase in the inherent stability and, furthermore, to also integrate this portion of the outer wall of the water jacket into the force transfer between the cylinder head on the one hand and the base frame on the other, while exploiting the improved tensile strength of vermicular grey cast iron. This means that respectively six fastening screws are associated with the respectively four fastening screws of the cylinder head for each cylinder in the associated region of the base frame.

A further advantageous feature of the invention provides that on the cylinder block in the region enclosed by the downwardly extended outer wall of the water jacket respectively the lower free edges of the cylinders form a delimiting plane with respect to the continuous free space in the longitudinal crankshaft direction. This permits a considerable weight reduction compared to the previously known designs, wherein the crankshaft bearings are arranged via supporting webs in the region of the parting plane between respectively two adjoining cylinders.

A further advantageous feature of the invention provides that the outer wall of the water jacket is respectively provided with at least one tensioning rib, which extends in the parting plane between two cylinders and is oriented outward and which extends between the region of the receiving bores for the cylinder head screws and the region of the receiving bores for the fastening screws for the base frame disposed in the same plane. By way of the arrangement of such a tensioning rib, which extends here in the greatly constricted region of the outer wall of the water jacket, the forces which are active between the cylinder head and the base frame and which are to be absorbed by the cylinder block can mainly be absorbed via this tensioning rib so that the desired defined force flow, which is as straight-lined as possible, is further improved between cylinder head and base frame.

A further advantageous embodiment of the invention provides that the base frame is provided on at least one longitudinal side with at least one longitudinally extending oil duct from which a side duct branches off respectively in the center plane of a crankshaft bearing; the side duct respectively extends through the receiving bores, which extend in the plane on this side, of the fastening screws for the base frame and for the bearing cap and ends in the bearing cap. Compared to the previously known cylinder block, wherein the oil duct was still cast into the wall of the water jacket, the solution according to the invention offers the advantage that the oil duct is now arranged in a region of the base frame which needs to be provided with a relatively thick wall to start with. Since it is much easier to chuck the base frame for machining in its geometrically greatly simplified design, the machining of the longitudinally extending oil duct as well as the machining of the side ducts branching off therefrom can be accomplished through a simple drilling operation, optionally in only one setting. In this context, it is useful if the receiving bores for the fastening screws of the base frame and of the bearing caps have an enlarged diameter respectively in the region through which a side duct is passing. This arrangement has the advantage that additional material allowances do not have to be provided on the base frame for the guidance of the side ducts. Rather, the side ducts can each be guided in the center plane of a crankshaft bearing. By arranging an enlarged region in the receiving bores, the oil that must be supplied for lubricating the crankshaft bearings can respectively flow around the fastening screws in this region.

A further advantageous feature of the invention provides that the base frame is cast and machined as a functional unit with the bearing caps of the crankshaft bearings, with the bearing caps being formed onto the base frame in operational function and being separated from it later. This arrangement offers the advantage that the base frame with its crankshaft bearings including the associated bearing caps can be machined as a unit; during this process, it is possible to accomplish the base surface of the base frame and the contact face of the base frame associated with the contact face on the water jacket as well as the tapholes for the fastening screws, the bores of oil duct and side ducts. During this process, the bearing caps can be separated from the base frame in a first step and the seating surfaces for the bearing caps can be machined together with the corresponding surfaces of the base frame. However, it is advisable to first carry out all mechanical machining of the surfaces and to subsequently shear off the bearing caps from the base frame after the machining is complete; during this process, the fracture behavior of the grey cast iron material is exploited in an advantageous manner.

DE-A-37 37 211 teaches to also cast the associated bearing caps onto an engine block with integrally cast-on bearing blocks and to separate them after machining. But since the bearing caps are cast together with the engine block, the bearing caps are oriented in the same manner as the associated bearing blocks, while very stable connecting webs must be provided for the connection of the bearing caps to the bearing block, which connecting webs are subsequently separated, but which, in their mass, remain on the engine block and result in an additional weight increase of the engine block, the increase having no function for the finished engine.

BRIEF DESCRIPTION OF THE DRAWINGS

The invention is explained in greater detail by way of schematic diagrams of a cylinder block for a multiple-cylinder internal combustion engine. The drawings show.

DETAILED DESCRIPTION OF THE DRAWINGS

Figure 1:
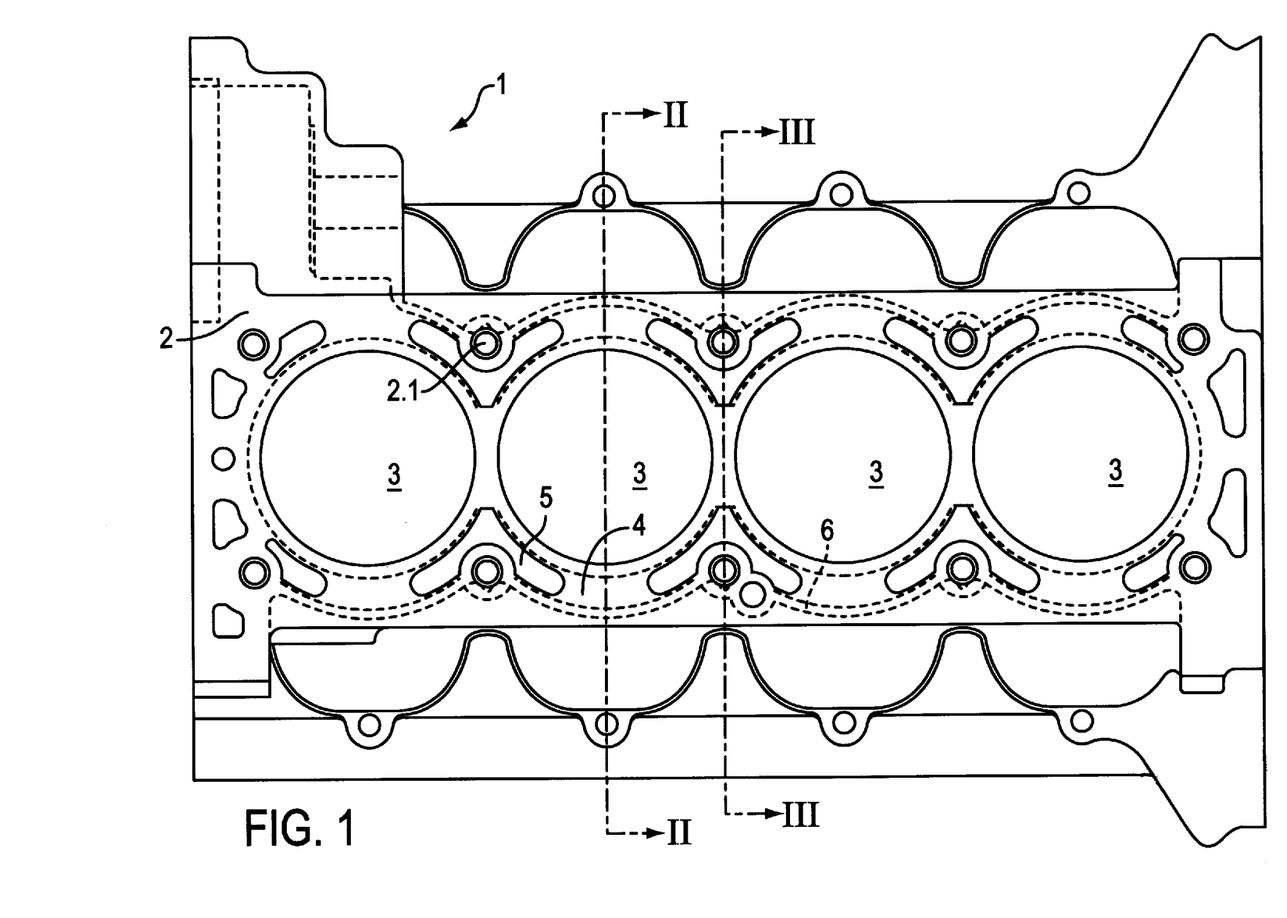
FIG. 1 is a plan view of a cylinder block with the cylinder head removed.

The engine block 1, shown in a plan view in FIG. 1, for a multiple-cylinder in-line engine is shown here with the cylinder head being removed, so that the associated sealing surface 2 is visible. As the plan view also shows, the individual cylinders 3 are connected by means of material-to-material bonding and are thus an integral component of the engine block 1. The cylinders 3 are surrounded by a water jacket 4 whose passage openings 5 are also visible in the region of the removed cylinder head. Respectively in the region of the parting plane between two cylinders, the cylinder head can be connected by means of two cylinder head screws, shown here by their tapholes 2.1, so that there are altogether four fastening screws for each cylinder. The water jacket 4 is delimited toward the inside by the respective cylinder and toward the outside by an outer wall 6.

Figure 2:
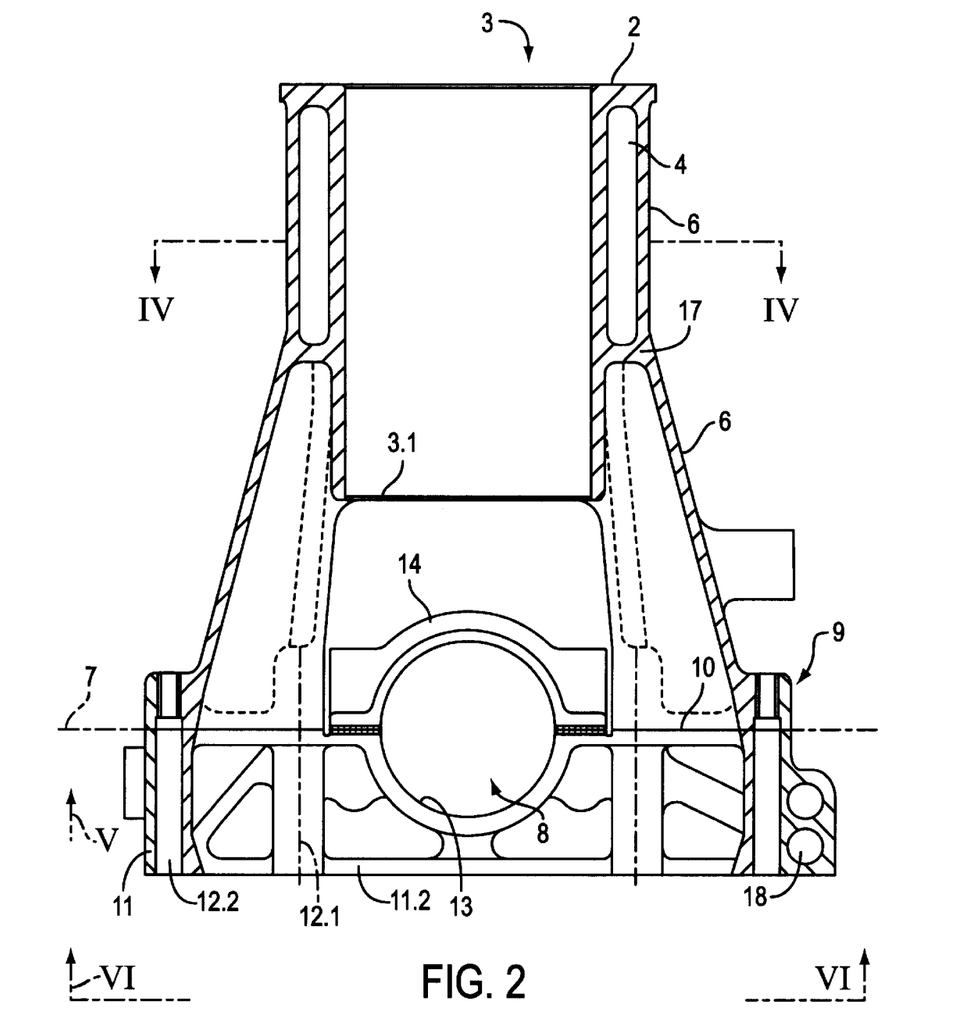
FIG. 2 is a vertical section according to the line II—II in FIG. 1.

The vertical section shown in FIG. 2 along the line II—II in FIG. 1 illustrates the basic design. Components that were already described with reference to FIG. 1 are identified with the same reference numerals, so that these components can be identified easily in FIG. 2 by way of the reference numerals. As is shown in the sectional representation, the outer wall 6 of the water jacket 4 is extended into the region of the parting plane 7 of the crankshaft bearing 8. On its circumferential free edge 9, the extended outer wall 6 is provided with a contact face 10 against which rests a base frame 11 which is fastened by means of fastening screws; the fastening screws are shown here only by the associated throughholes and tapholes. Only the throughholes and/or tapholes 12.1 and 12.2 for these fastening screws (not shown) are shown here to simplify the representation in the drawing.

The crankshaft bearing 8 on the base frame 11 is designed such that the bearing shell part 13 disposed on the base frame 11 is oriented in the direction toward the cylinder 3, so that the associated bearing cap 14 is arranged on the side of the base frame 11 that is facing the cylinders 3.

Figure 3:
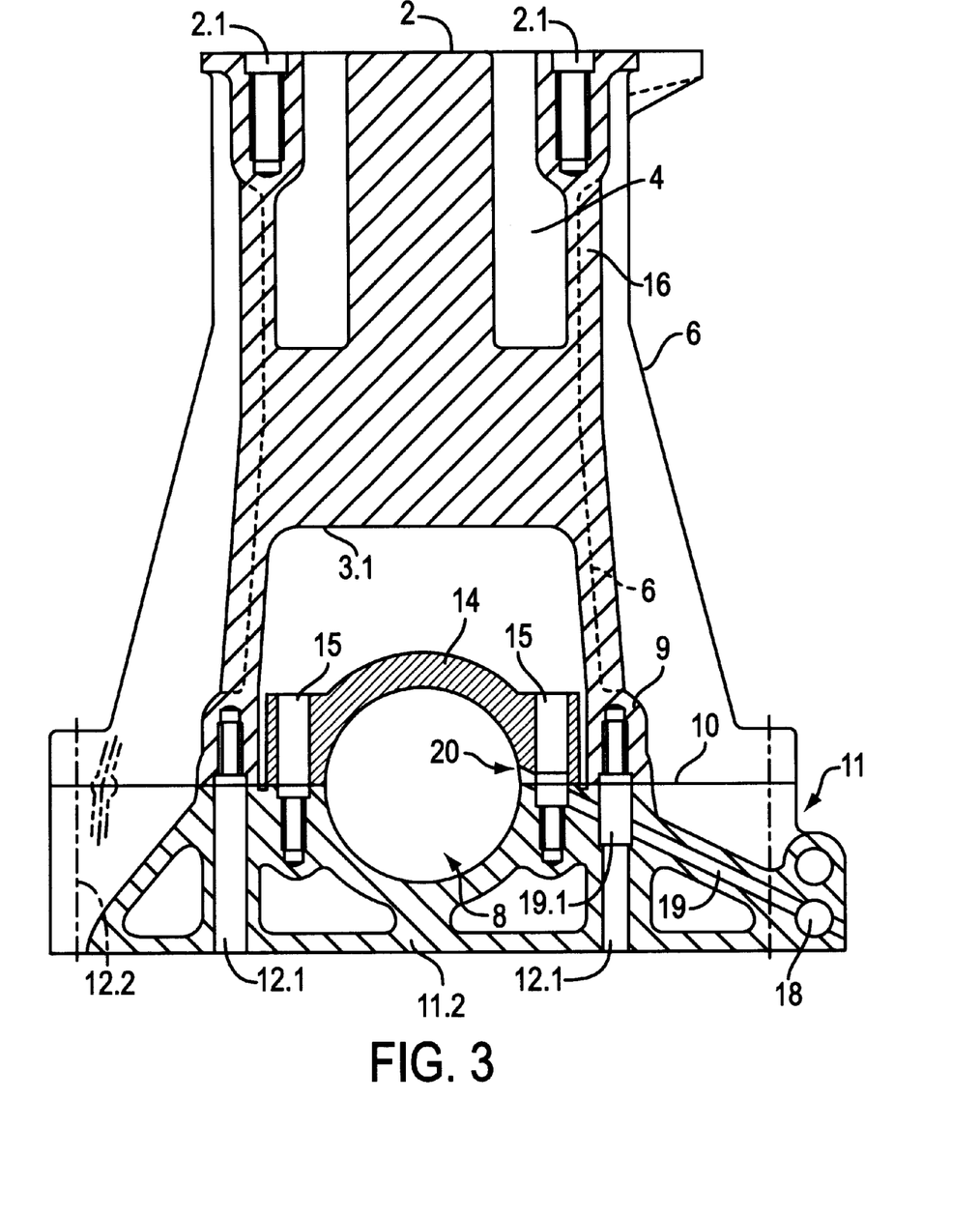
FIG. 3 is a vertical section according to the line III—III in FIG. 1.
Figure 5:
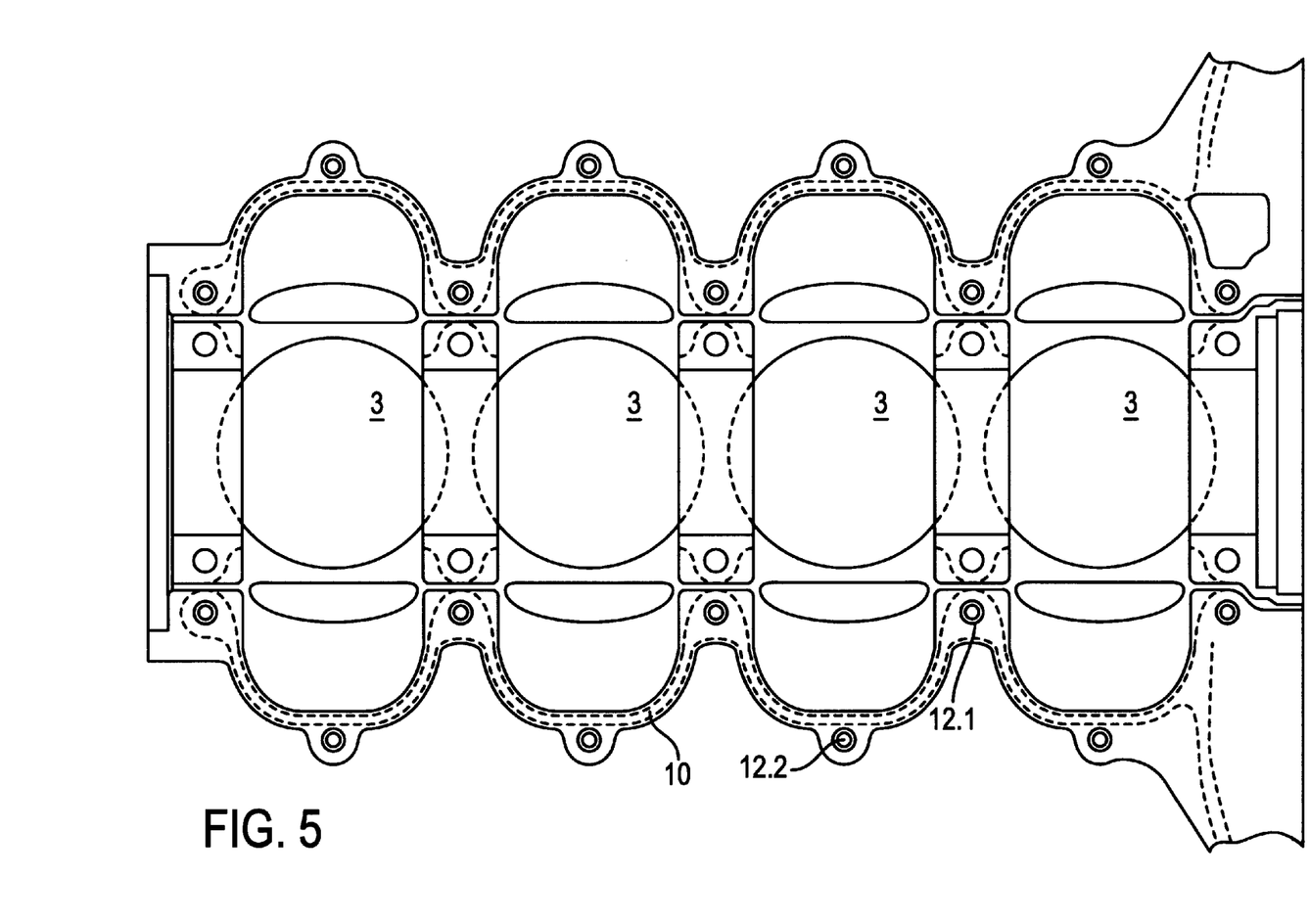
FIG. 5 is a view of the contact face of the extended outer wall of the water jacket (taken along parting line 7 in the direction of arrow V in FIG. 2)

FIG. 3 now shows the vertical section according to the line III—III in FIG. 1, which section extends through the parting plane between respectively two adjoining cylinders. As can be seen from a comparison of the plan view according to FIG. 1 and the sectional representation in FIG. 2 and FIG. 3, the extended outer wall 6 has a wave structure in a horizontal section not only in the region of the water jacket 4 but also in its extension in the region of the parting plane 7, with the "wave crown" being disposed in the region of the section plane II—II and the "wave trough" in the region of the section plane III—III. This is also illustrated in the view from below shown in FIG. 5 which is oriented against the contact surface 10 of the extended outer wall 6 of the water jacket 4. FIG. 5 shows this view with the base frame removed. The throughholes 12.1 and 12.1 for the screws for the fastening of the base frame are also visible in their geometric allocation to the respective cylinder. This will be explained below in greater detail.

Figure 6:
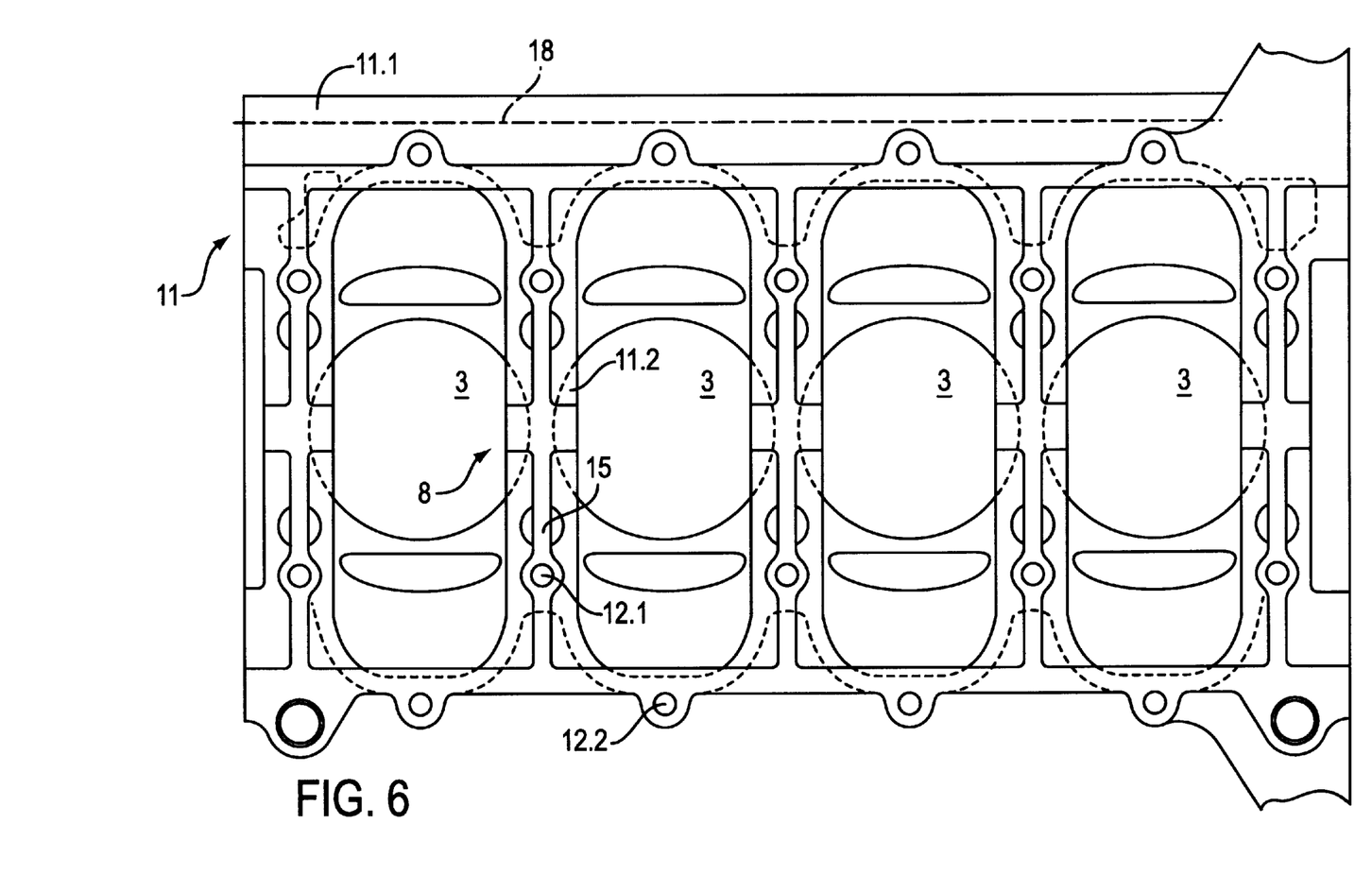
FIG. 6 is a view of the occupied space of the base frame (taken along arrow VI—VI in FIG. 2).

FIG. 6 then shows the base frame 11 also in a view from below. As can be seen here, the base frame 11 has an outer circumferential frame section 11.1, which is provided with transverse webs 11.2 respectively in the region of the parting plane between two adjoining cylinders 3, only hinted at here. The crankshaft bearing 8 is seated respectively on these transverse webs 11.2.

This illustration also shows the throughholes 12.1 and 12.2 for the fastening screws for connecting the base frame 11 on the free edge 9 of the extended outer wall 6 of the water jacket. The allocation of the fastening screws 15 of the bearing caps 14 of the individual crankshaft bearings 8 is visible in FIG. 6 by way of the identification of their longitudinal axis.

As can be seen from FIGS. 2, 3, 5 and 6, the throughholes or screw holes 12.1 and 12.2 for the fastening screws (not shown) for the fastening of the base frame 11 are each arranged such that the throughholes 12.1 are respectively disposed in a "wave trough" of the wave structure of the outer wall 6 of the water jacket 4, whereas the other throughholes 12.2 are respectively disposed in the region of a "wave crown". Thus, the base frame 11 is fastened with six screws per cylinder, whereas the cylinder head, as is shown in the plan view according to FIG. 1, is fastened with four screws per cylinder. Here, the arrangement is now such that the throughholes 12.1 are almost in alignment with the cylinder head screws 2.1, so that the tensile forces occurring during operation respectively during the power stroke and the compression stroke are absorbed by four screws in the region of the cylinder head and by respectively six screws in the region of the base frame 11. In this context, it is important that the forces acting on the crankshaft bearing 8 are absorbed respectively via the web 11.2, so that the fastening screws 15 of the bearing caps 14 are respectively exposed to a considerably lesser load and, accordingly, the fastening screws 15 as well as the bearing cap 14 can be designed to have a much thinner wall and therewith a reduced weight. Since the fastening screws for the base frame 11, which are respectively disposed in a "wave trough", are arranged almost in alignment with respect to the cylinder head screws of tapholes 2.1, the tensile forces are transferred practically in a straight line between cylinder head on the one hand and base frame 11 on the other.

Figure 4:
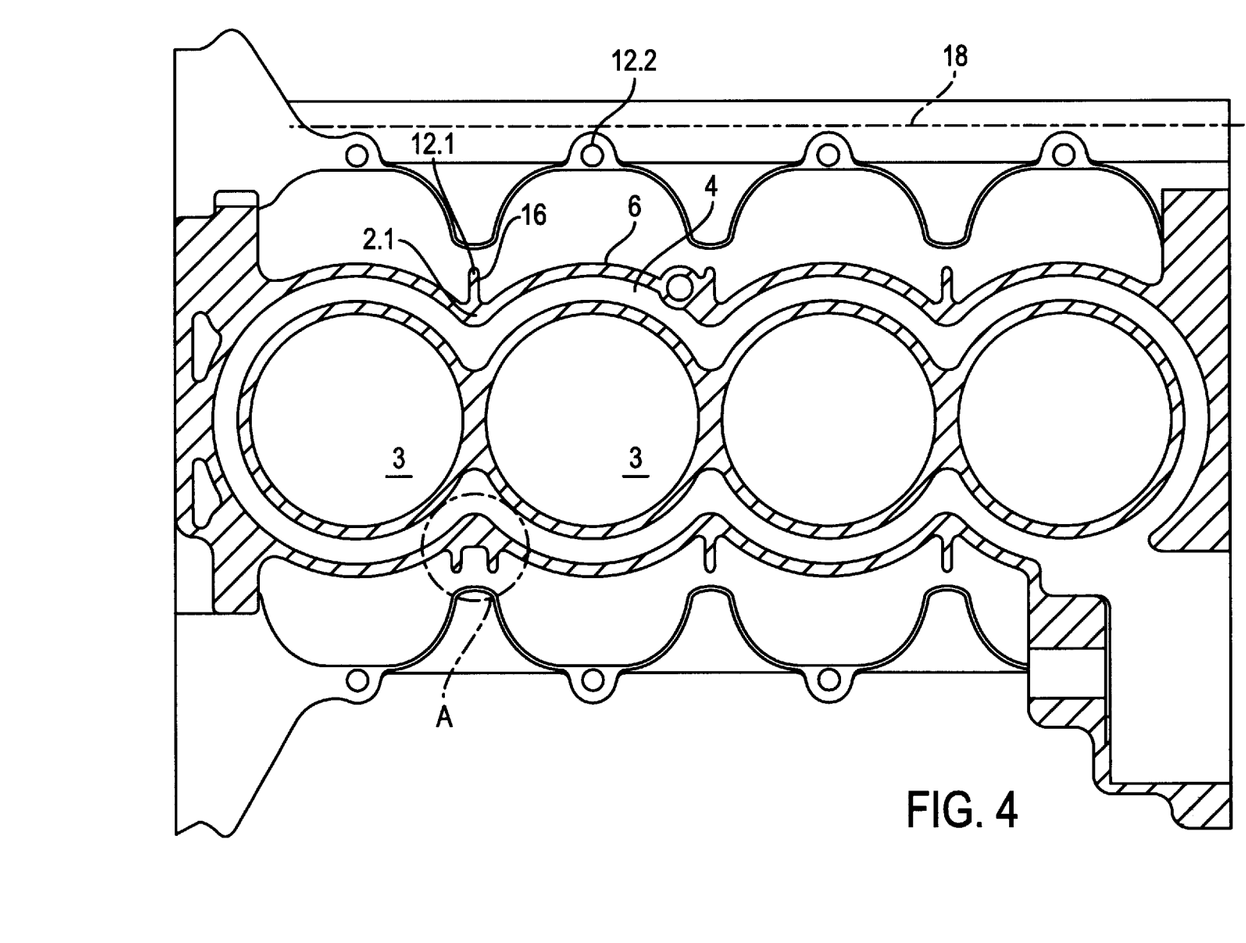
FIG. 4 is a horizontal section through the water jacket according to the line IV–IV in FIG. 2 or FIG. 3.

To increase the tensile strength of the material of the outer wall 6 of the water jacket 4, a tensioning rib 16 is provided respectively in the parting plane between two cylinders 3, which tensioning rib is oriented outward, as can be seen in the horizontal section according to FIG. 4 and the vertical section according to FIG. 3. In a modification of the design, it is possible, however, to provide two parallel extending tensioning ribs instead of one tensioning rib, as is indicated in FIG. 4 by the region identified by the circle A.

FIG. 4 also identifies the positions of the throughholes and/or tapholes 12.1 on the free edge 9 as well as of the cylinder head screws of tapholes 2.1, respectively by way of their center axis.

As described above, the crankshaft bearings 8 are arranged on the base frame 11 which, in turn, can be configured as a frame construction at least in the region of the webs 11.2. This means that the spatial region disposed above remains continuously free and is delimited toward the top only by the delimiting wall 17 of the water jacket 4, with only the lower end 3.1 of the respective cylinder projecting into this region, as can be seen in FIG. 3. The otherwise customary material accumulation for the webs of the crankshaft bearings is omitted.

The oil supply for the individual crankshaft bearings 8 can now be designed in such a manner that a longitudinally extending oil duct 18 is arranged on one side of the base frame 11, from which oil duct a side duct 19 branches off respectively in the region of a web 11.2; the side duct extends up into the region of the bearing cap 14. Since in the given arrangement, the side duct 19 respectively penetrates the receiving bores or throughholes 12.1 for the fastening screws of the base frame as well as the receiving bores for the fastening screws 15 of the bearing cap 14, the arrangement in this region is provided such that, respectively in the passage region of the side duct 19, the bores or throughholes 12.1 and 12.2 and the bores for the screws 15 are respectively provided with an expansion 19.1 in this region so that, in the assembled state, the oil flowing from the longitudinally extending oil duct 18 through the side duct 19 flows around the inserted fastening screws in this region and can thus be guided to the associated crankshaft bearing via the discharge opening 20 in the bearing cap 14.

What is claimed is:

1. A cylinder block for a multiple-cylinder internal combustion engine having a multiply seated crankshaft and having a water jacket surrounding a plurality of cylinders, with an outer wall of the water jacket being extended downward extending approximately into a parting plane of a crankshaft bearing and a circumferential free edge of the water jacket forming a contact face, and having a base frame which rests against the contact face and is connected with the same, on which base frame the crankshaft bearings are arranged whose detachable bearing caps are arranged and fastened by screws on the side of the base frame facing the cylinders, and wherein the base frame is connected to the circumferential free edge of the outer wall of the water jacket by means of screws extending in a center plane of the crankshaft bearing, and further wherein the screws are approximately aligned with a plurality of screws for fastening the cylinder head.

2. A cylinder block according to claim 1, wherein, in addition to the screws arranged in the center plane of the crankshaft bearing, the base frame is connected with the circumferential free edge of the outer wall of the water jacket via respectively two further screws associated with the cylinder, with screws being arranged respectively in a parallel plane extending through the cylinder axis.

3. A cylinder block according to claim 1, wherein, in the region enclosed by the downwardly extended outer wall of the water jacket, a plurality of lower free edges of the cylinders form a delimiting plane with respect to the continuous free space in the longitudinal crankshaft direction.

4. A cylinder block according to claim 1, wherein, the outer wall of the water jacket is respectively provided with at least one tensioning rib, which extends in the parting plane between two cylinders and is oriented outward and which extends between the region of the receiving bore for the cylinder head screws and the region of the receiving bores for the fastening screws for the base frame disposed in the same plane.

5. A cylinder block according to claim 1, wherein, the base frame is provided on at least one longitudinal side with at least one longitudinally extending oil duct from which a side duct branches off respectively in the center plane of a crankshaft bearing, with the side duct respectively extending through the receiving bores, which extend in the plane on this side, of the fastening screws for the base frame and of the bearing cap and ending in the bearing cap.

6. A cylinder block according to claim 1, wherein, a plurality of receiving bores for the fastening screws of the base frame and of the bearing caps have an enlarged diameter respectively in the region that is extended by a side duct.

7. A process of making the cylinder block of claim 1, wherein the base frame is cast and machined as a functional unit with the bearing caps of the crankshaft bearings, and with the bearing caps being formed onto the base frame in operational function and being separated from it later.

* * * * *